United States Patent [19]

Hohenemser

[11] 4,439,105

[45] Mar. 27, 1984

[54] OFFSET-AXIS WINDMILL HAVING INCLINED POWER SHAFT

[75] Inventor: Kurt H. Hohenemser, Brentwood, Mo.

[73] Assignee: Jerome A. Gross, Clayton, Mo.

[21] Appl. No.: 307,862

[22] Filed: Oct. 2, 1981

Related U.S. Application Data

[63] Continuation-in-part of Ser. No. 49,348, Jun. 18, 1979, Pat. No. 4,298,313.

[51] Int. Cl.$^3$ .............................................. F03D 7/04
[52] U.S. Cl. ...................................... 416/13; 416/41; 416/102
[58] Field of Search ................... 416/13, 98, 11, 41 A, 416/102, 148, 14–15

[56] References Cited

U.S. PATENT DOCUMENTS

| | | | |
|---|---|---|---|
| 1,491,997 | 4/1924 | Messick | 416/131 |
| 1,698,709 | 1/1929 | Bucklen et al. | 416/13 |
| 1,707,924 | 4/1929 | Potts | 416/13 |
| 1,767,303 | 6/1930 | Miller | 416/13 |
| 1,786,057 | 12/1930 | Fales | 416/148 X |
| 1,818,672 | 8/1931 | Bucklen | 416/13 X |
| 3,575,530 | 4/1971 | Hall | 416/102 X |
| 3,667,861 | 6/1972 | Parish | 416/14 |
| 4,068,131 | 1/1978 | Jacobs et al. | 416/132 B X |
| 4,084,921 | 4/1978 | Norz | 416/17 |
| 4,201,514 | 5/1980 | Huetter | 416/37 |
| 4,297,075 | 10/1981 | Jacobs et al. | 416/14 |
| 4,298,313 | 11/1981 | Hohenemser | 416/98 |

FOREIGN PATENT DOCUMENTS

| | | | |
|---|---|---|---|
| 98876 | 11/1923 | Austria | 416/132 B |
| 209552 | 1/1924 | United Kingdom | 416/9 |
| 227051 | 1/1925 | United Kingdom | 416/13 |
| 278122 | 10/1927 | United Kingdom | 416/13 |

Primary Examiner—Everette A. Powell, Jr.
Attorney, Agent, or Firm—Jerome A. Gross

[57] ABSTRACT

An offset-axis type wind generator uses a passive cyclic pitch-change rotor whose shaft axis is inclined downward and aft, with its sense of rotation selected so that the yaw component of the shaft torque at least partially of the shaft torque offsets that component of thrust which accompanies power extraction. A wind-alignment vane extends from a boom mounted on a furling hinge, equipped with mechanism to limit the vane's anti-furling moment to balance only the remainder of the moment of rotor thrust. Hence, disengagement of power extraction does not cause the rotor to overspeed, and the machine may idle even in gale-force winds, furled to nearly 90°.

11 Claims, 6 Drawing Figures

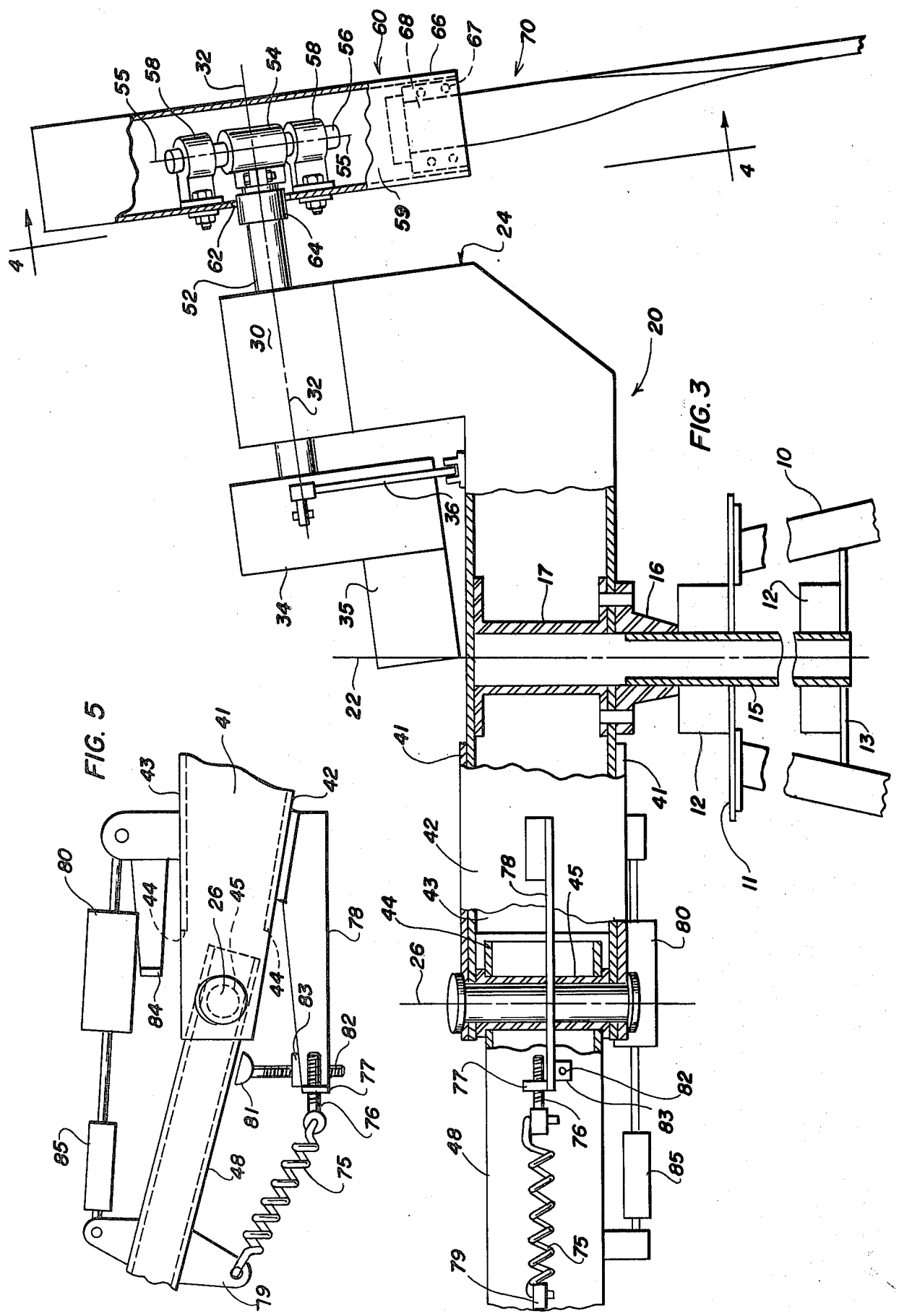

OFFSET-AXIS WINDMILL HAVING INCLINED POWER SHAFT

CROSS-REFERENCE TO RELATED APPLICATIONS

This is a continuation-in-part of co-pending U.S. application Ser. No. 06/049,348, filed June 18, 1979, entitled "Horizontal Axis Wind Generator Having Adaptive Cyclic Pitch Control" now U.S. Pat. No. 4,298,313.

FIELD OF THE INVENTION

This invention relates to wind energy conversion machines, and particularly to the type in which a rotor is mounted at the windward side of the mast with its axis offset sideward from the mast yaw axis, and is presented at varying angles out of the wind by a wind-alignment vane, relative to which the rotor is designed to furl to substantial angles out of the wind, increasing with wind speed, to control its rotational speed.

BACKGROUND OF THE INVENTION

Windmills whose rotor axes are offset sideward from the vertical axis of a mast have their rotors presented at angles out of the wind varying with wind speed. This is accomplished by a mechanism which gradually furls the rotor relative to a trailing wind-alignment vane. Such windmills have been in some use for a number of years, for water pumping and small scale generation of electricity. These windmills usually employ a relatively large number of fixed pitch blades of small diameter; however, a two-bladed fixed pitch flexible tipped rotor is shown in U.S. Pat. No. 1,818,672. The swinging motions of such windmills, caused and excited by changes in wind direction as well as by the furling and unfurling, have made it not feasible to use efficient two-bladed rotors; excessive gyroscopic and aerodynamic forces would be imposed on the larger-diameter blades, which under high, shifting winds would be likely to snap off.

In the co-pending application referred to above, it is disclosed that such gyroscopic and aerodynamic forces on rotor blade elements are nearly eliminated in rotors in which the blades passively undergo cyclic pitch change when the rotor axis is presented angularly relative to the wind. The thrust vector of the blades of such a passive cyclic pitch rotor will be directed closely along the axis of rotation even when at a substantial angle—up to say 60°—to the wind direction (the aerodynamic drag of the hub itself is not, of course, so directed). The substantial coincidence of the blade thrust vector with the rotor axis despite furling, and the lack of destructive gyroscopic and aerodynamic forces on the blade elements, in combination with the other novel features of the present invention, make the passive cyclic pitch change rotor uniquely fitted for use with the offset-axis furling rotor windmill.

One potentially destructive operating condition, to which offset-axis windmills is subjected, is the uncoupling of the power extraction means during full-speed operation. This may occur, for example, during high winds, when the generator is switched off or other power-extraction means is uncoupled, either intentionally or inadvertently. Uncoupling the torque load from an offset-axis rotor may cause the rotor to so overspeed as to endanger the rotor. This may be explained as follows:

In a somewhat idealized offset-axis machine, once the rotor reaches its intended speed of rotation, its thrust is held constant. Since the machine is entirely free to yaw about the axis of the mast, the only element resisting furling to a stop is the design anti-furling moment supplied by an easily-extensible spring. The rotor-applied moment about the furling hinge cannot exceed this resisting moment; therefore, the product of the thrust force on the rotor and its moment arm about the yaw axis (ideally the fixed offset of the rotor axis) must be equal to the fixed anti-furling moment so supplied. If it is substantially constant, so will be the rotor thrust; the rotor furls to such angle out of the wind as will maintain the moment of its thrust equal to the resisting moment of the spring. However, using such a fixed pitch rotor, its thrust vector will depart from the shaft axis with increased angles of furl, making speed control difficult. Further, when the torque load on the rotating rotor is released, it can maintain its thrust force (and therefore the moment of its thrust) only by overspeeding to a much higher rate of rotation, which may endanger it.

SUMMARY OF THE INVENTION

The purposes of the present invention are principally to overcome these problems of prior art offset-axis furling rotor windmills; and to create an offset-axis mill of the efficient two-bladed type which quickly and accurately adapts its positions in yaw and furling to shifting and gusty winds, and which is not endangered, but instead is substantially unaffected, by uncoupling the torque load at or above design speed of rotation.

These purposes are here accomplished by utilization of the passive cyclic pitch two-bladed rotor with its rotor axis inclined downwardly and aft, at a sufficient angle and with the sense of rotation so selected that its torque vector includes a yaw component which (a) opposes the moment of the rotor thrust, and (b) is equal in amount to that increment of thrust moment due to the torque loading. With these design criteria, uncoupling the load from the rotor will drop out the yaw component of the torque vector as it drops out the substantially equal but opposite increment due to loading of rotor thrust times moment arm. Hence, uncoupling the load causes little tendency to overspeed; the rotor speed remains substantially unaffected as power generation discontinues.

Using the passive-cyclic pitch rotor, the thrust forces of the blades are so well directed along the rotor axis, and the gyroscopic and aerodynamic forces are so effectively limited, that the offset-rotor configuration achieves its ideal of constant speed operation much more closely than heretofore, despite changes of wind direction and speed; and with the downwardly-inclined thrust axis, even despite uncoupling from power extraction.

BRIEF DESCRIPTION OF THE DRAWINGS

FIG. 3 is a fragmentary side view, partly in section and partly schematic, showing the cyclic pitch rotor hub and the arrangement of the mechanical elements relative to the yaw axis and the furling hinge axis.

FIG. 5 is a fragmentary plan view showing details in the region of the furling hinge axis of FIG. 3.

DESCRIPTION OF THE PREFERRED EMBODIMENTS

Figure 1:
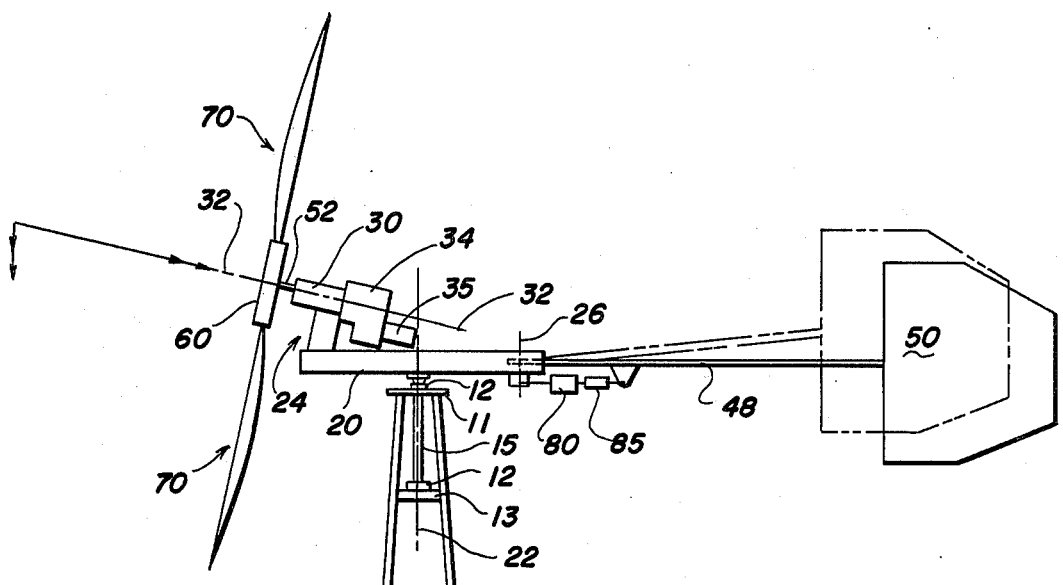
FIG. 1 is a schematic elevation of a wind energy conversion machine embodying the present invention, illustrating how the downward slope of the thrust axis provides the shaft torque with a yaw component. The phantom lines show the rise of the vane boom on furling.

In the first illustrated preferred embodiment, certain of the mechanical components utilized are so familiar that they need be illustrated only schematically. Thus, in FIG. 1 a mast 10 is shown having a horizontal top plate 11 incorporating a conventional heavy yaw support bearing 12 and having a horizontal subplate 13 a short distance below the top plate 11 equipped with a similar bearing 12.

Received within the bearing 12 of the top plate 11 and extending through that of the subplate 13 is a rotatable yaw post 15 mounted in a downward-presented flange 16, which structurally is the continuation of an internal reinforcing post 17 of a rotatable components support platform generally designated 20.

Figure 2:
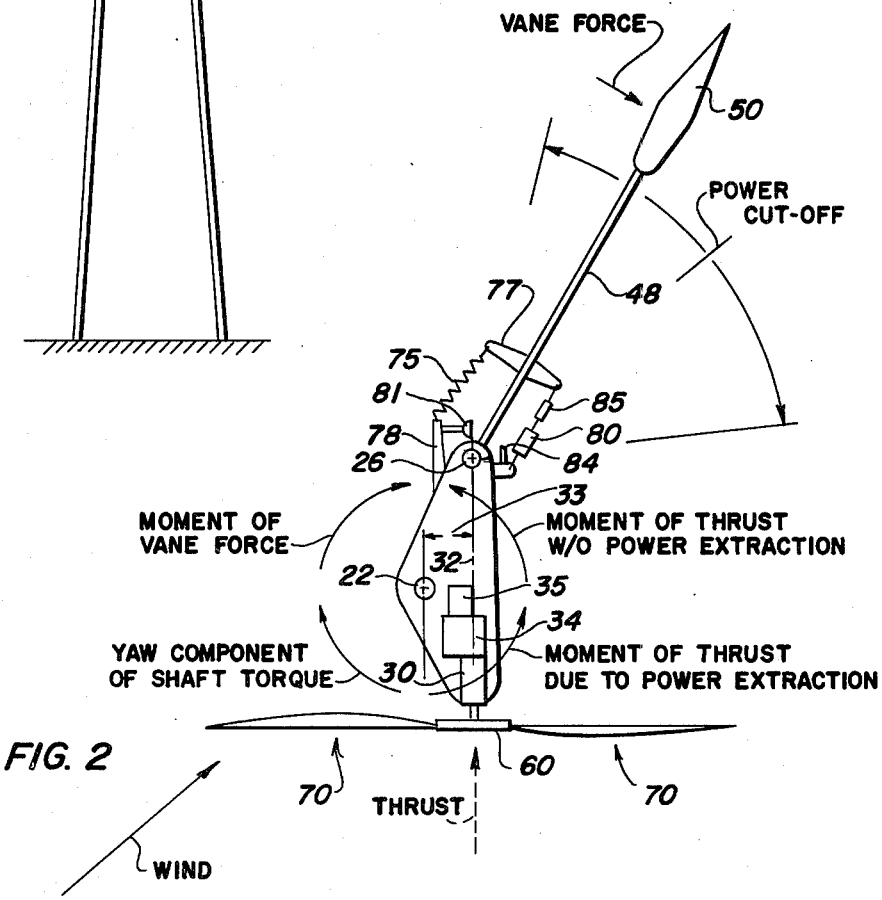
FIG. 2 is a schematic plan view of the rotor of FIG. 1 illustrating the components of moment exerted about the yaw axis.
Figure 6:
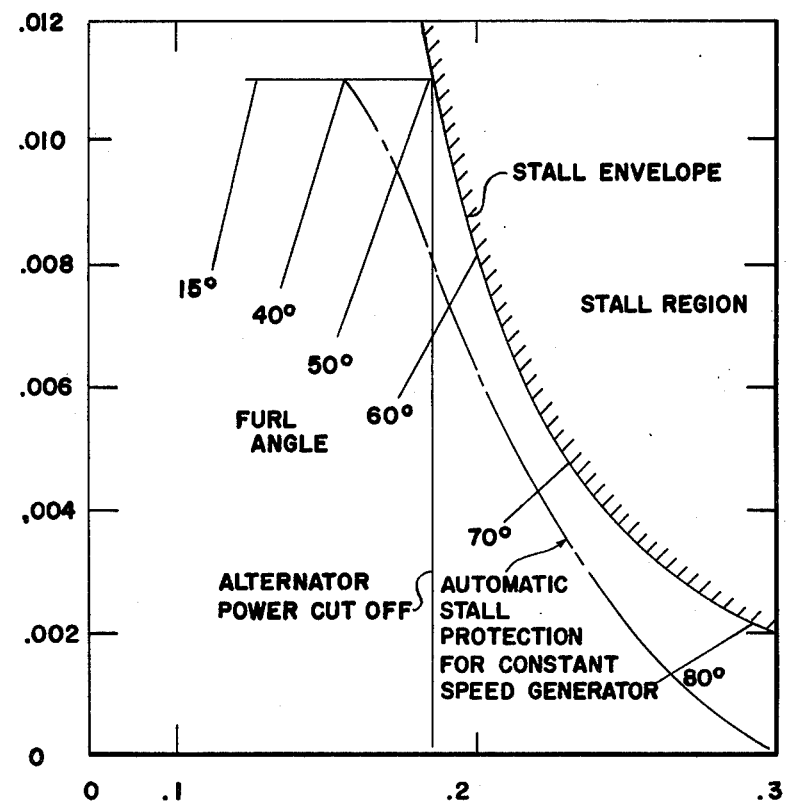
FIG. 6 is a graphic presentation showing how by permitting the rotor to furl at increasing wind speed ratios, relatively high torque coefficients are realized with safety.

The platform 20, shown to be of hollow metal construction, may instead be a somewhat triangular space framework or other familiar type of structure. It supports with rigidity three principal points: its mount on the yaw axis 22, a forward components support generally designated 24, and an aft furling hinge axis 26. Its plan form is shown more or less schematically in FIG. 2, while one form of suitable structure is illustrated in FIG. 3. The forward component support 24 extend upward to incline its upper surface aft at a suitable angle in the range of 4° to 12°, to support a conventional shaft bushing 30 which defines the rotor thrust axis 32. In plan form (as seen in FIG. 2) the rotor thrust axis is offset from the yaw axis 22 by a moment arm 33 measured at approximately 0.025 times the rotor radius or in the range of 0.020 to 0.030 times such radius. This range refers to a ratio of blade area to disc area of approximately 0.032.

The components which the platform 20 supports for yawing (hereinafter referred to as wind-responsive components) include the rotor, hereinafter described more fully; its power-extraction means, here shown to be a shaft-mounted speed increaser 34 and a generator 35 of a type selected for the particular utilization, together restrained from rotation by a torque link 36 secured to the platform 20 and the vane assembly and its controls, hereafter described.

At the aft end of the platform 20 along the furling hinge axis 26 (which in FIG. 3 is shown as slightly canted from vertical) are provisions for mounting a vane assembly here-inafter referred to. Referring to FIG. 3, the preferred provisions include upper and lower reinforcing plates 41 and left and right side plates 42, 43 having a cut-away edges 44 to provide an opening for relative angular movement of the vane boom to be described. A furling hinge bushing 45 is installed through the hollow platform 20 and its upper and lower reinforcing plates 41 on the furling hinge axis 26, somewhat canted from the vertical to incline the plane of such angular movement out of the plane of the drawing.

Mounted on a boom bushing 45 is a vane boom 48, which may be tubular and of oval shape, fitted within the open back end of the platform 20 in the opening provided at the rear of the cut-away side plates 42, 43, for swinging in the sense shown in FIG. 2. At the aft end of the vane boom 48 is mounted a conventional vane 50 which may be shaped as an aerodynamic surface to provide a sideward lift force as shown in FIG. 2. The vane 50, its boom 48 and their control components are designed by conventional criteria to hold the vane in alignment with the wind, however it may shift, while controlling furling of the platform 20 and all components forward of the furling axis by providing a design antifurling moment as hereinafter discussed.

A power shaft 52, mounted in the shaft bushing 30 along the thrust axis 32 and which delivers the rotor torque through the shaft bushing 30 to the speed increaser 34, serves to project the rotor, to be described, forwardly of the mast 10. The rotor is so mounted as to permit passive change of the blade pitch cyclically by the mechanism shown in FIGS. 3 and 4. On the forward end of the power shaft 52 is clamped a cross-shaft fitting 54. In it, mounted on a cross-shaft axis 55 perpendicular to the thrust axis 32, is a short cross shaft 56 whose projecting ends are mounted for angular oscillatory movement within pillow blocks 58 secured onto the inner surface of the back face 59 of a hollow rectangulr hub generally designated 60. The power shaft 52 enters the hub 60 through a bore 62 in its back face, the bore 62 being larger in diameter than the diameter of the shaft 52. A substantial part of the difference in their diameters is compensated for by a tubular resilient cushion 64 mounted on the portion of the power shaft 52 which enters the hollow hub 60 through the shaft bore 62. The cushion 64 serves as a resilient stop to limit the tilting of the hub 60 relative to the power shaft 52 (that is, the oscillations of the cross shaft 56 in the pillow blocks 58) to a range of approximately plus or minus 10°–12°.

The hub 60 has two socket ends 66 equidistant from the power shaft 52. In them are mounted, by clamping means 67, the root ends 68 of the two rotor blades generally designated 70 positioned along the hub axis 72. The blades 70 utilized in a test machine were of the glass fiber/epoxy composite type. The preferred blades are slender; the ratio of blade area to rotor disc area chosen is approximately 0.032.

Figure 4:
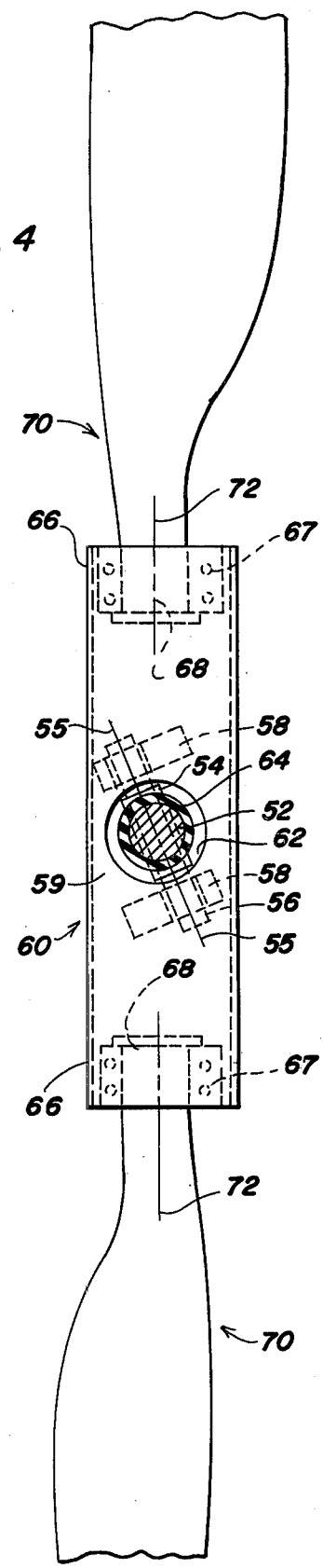
FIG. 4 is a sectional view taken along line 4—4 of FIG. 3.

As best seen in FIG. 4, the hub axis 72 which joins the blades 70 and the axis 55 of the cross shaft 54 are both perpendicular to the axis of the power shaft 52 but with the cross-shaft axis 55 angularly in advance, considering the direction of rotation of the power shaft 52. The hub axis 72 thus lags behind the cross-shaft axis 55; the angular difference in the present case is 22°, or within the range of 10° to 30°. This angle positions the aerodynamic centers of the blades 70 substantially aft of the cross-shaft axis 55. The rotor, as it tilts on the cross shaft 56, is positively stable, in the sense that aerodynamic forces urge the two rotor blades 70 to have equal lift.

The result is that the mere rocking of the hub 60 on the cross-shaft axis 55 changes the blade pitch cylically. This functions passively, that is, without any control force. Thus the increased lift force on one of the blades 70 as it encounters the relative wind increased by a side wind component causes it to reduce its angle of attack by tilting on the cross shaft 56 while the angle of attack of the opposite blade is increased correspondingly. Such cyclic pitch change is permitted within the oscillating range of plus or minus 10°-12°, as limited by the compressive resilience of the shaft cushion 64 bearing against the edge of the shaft bore 62 in the hub back plate 59. Other angle-limiting and oscillation-resisting substituted, such as elastomeric bushing for the cross shaft 56.

With the blades 70 so adjusting their pitch cyclically with cross winds, the vector of their thrust (that is, the actual thrust axis 32) will be directed substantially along the axis of the power shaft 52, despite furling of the rotor and associated components relative to the vane 50 held in alignment with the wind. Referring back to FIG. 2, the result is that the moment of the thrust about the yaw post 15 becomes a simple function of the rotor thrust and the moment arm 33 (the amount of offset of the thrust axis 32 from the yaw post 15). This constancy of offset from the yaw post of the actual thrust vector resulting from the cyclic pitch change of the blades, achieves substantially constant thrust over a substantial range of wind speeds by progressively furling the rotor relative to the vane 50.

The moment components as well as some of the mechanism involved in furling about the furling hinge 26 are shown schematically in the plan view FIG. 2. With the power shaft 52 offset to the right of the yaw post 15, the thrust moment about the yaw post 15 will always be counterclockwise as shown, so that an increase in rotor thrust tends to yaw the rotor progressively out of the wind. The vane 50 is designed at such size as to maintain its position trailing in the wind by a vane force shown to act in a clockwise sense about the yaw post 15. The moment of the vane force about the yaw post 15 is limited by how much moment can be transmitted across the furling hinge axis 26. Accordingly, any mechanism or combination of mechanisms chosen to limit the moment transmissible across the furling hinge axis 26 limits the moment of the thrust and therefore (since it acts on a fixed moment arm) the thrust itself.

In the embodiment illustrated in FIGS. 3 and 5, this mechanism includes a simple extensible spring 75, the forward end of which is supported by the aft end of a horizontal rod 76, threaded in a transverse end lobe 77 at the aft end of a bracket arm 78 secured onto the side of the platform 20 just forward of the furling hinge axis 26 and extending somewhat aft of said axis. The other end of the spring 75 is held in a bracket 79 at the corresponding side of the boom 48. The spring 75 is under a set preload, but is designed to extend readily sufficiently to permit furling movement without a substantial increase in spring force. Bracket-mounted on the opposite side of the platform 20 and boom 48 is a simple conventional linear force damper generally designated 80. Stops are provided to limit movements about the furling hinge axis 26. An anti-furling stop 81, consisting of a transverse adjustable threaded rod 82 mounted in the side lobe 83 of the bracket arm 78, restricts the anti-furling movement of the platform 20 relative to the vane boom 48, so that the power shaft axis 52 can reach an angle relative to the boom 48 no less than approximately 10° of furl. At the opposite side, a furling stop 84 limits the maximum degree of furl to approximately 85°.

In addition to the moment transmissible through the spring 75, by canting the furling hinge axis 26, such as the lateral canting with its upper end emerging from the plane of the drawing as shown in FIG. 3, a component of the weight of the vane 50 and its boom 48 will be acting to afford some anti-furling moment. Furling will then cause the boom to rise slightly as shown in the phantom lines of FIG. 1. Designing the precise angle of cant of the furling axis, including the extent to which it may be advantageously canted in the plane of the drawing FIG. 3, involves considerations peculiar to anti-furling required by the particular installation at different furl angles. Some of these considerations, discussed later in this specification, may be developed and solved empirically.

The use of some sort of damper for oscillations in furling, such as the conventional hydraulic damper 80, was found to be necessary on a test installation. In addition, a remotely controlled furling device, such as a linear actuator 85 here shown on the same axis as the damper 80, is conventionally added to facilitate inspection and repair.

A serious practical problem in wind generators is rotor overspeed when power is disconnected either intentionally or inadvertently. In case of high winds the power will ordinarily be disconnected to protect the rotor; but this is the very time when overspeed can be most dangerous. In other types of wind generators, blades may be feathered or braked mechanically or aerodynamically; these systems require structure of much greater strength and mechanism of much greater complexity than the present system, in which the rotor is yawed out of the wind to limit power output. This system leaves, however, the danger of overspeed when the rotor is uncoupled from the power extraction means. Considering the problem applied more specifically to the yawing rotor system, the torque attendant to power extraction is accompanied by a large rotor thrust which exerts a counter-clockwise moment as shown in FIG. 2. In prior art constructions, the rotor thrust was overcome simply by the moment of the vane force in the relative wind. Such moment of vane force will continue if power is suddenly uncoupled; to balance it the uncoupled rotor must regain full thrust by speeding up.

In the present specification, the rotor thrust is treated as being made up of two components—the component of thrust accompanying power extraction, and the component of thrust of an unloaded rotor. In the ideal application of the present invention, only the moment of the latter thrust component is balanced by the movement across the furling hinge axis. The downward inclination of the shaft axis 32 and its sense or rotation are utilized in this invention to substantially balance the moment from the rotor thrust component accompanying power retraction.

For the rotor described, it is found that the preferred inclination in the range of 4°-12° will afford to the shaft torque a yaw component, illustrated in FIG. 1 by the vertical double-headed vector shown in accordance with the "right-hand rule." The sense of rotation of the rotor is chosen so that this vertical torque component is applied to yaw the rotor into the wind. The component of thrust accompanying power extraction applies a moment in the sense of yawing out of the wind. Both will vary with the power extracted.

The rotation arrows shown in FIG. 2 will now be explained. The two lower arrows show these two yaw components, which are dependent on extraction of power, offsetting each other. The two upper arrows represent yawing moments independent of the extraction of power—the component of thrust of the rotor not due to power extraction and the moment of the vane force.

Since the yaw component of shaft torque has been used to substantially balance out the moment of the thrust component accompanying torque, the moment of the vane force will be only great enough to balance out the moment of that component of thrust not due to power extraction. If power extraction ceases the yaw component of the shaft torque and the moment of thrust accompanying torque extraction both cease. This leaves the system in balance, with the moment of the vane force being compensated by the moment of thrust of the unloaded rotor; hence there is little tendency to overspeed on discontinuance of power extraction.

The invention is illustrated, using a spring and/or a gravity component of the boom weight to supply the requisite anti-furling moment, is particularly well suited for operation with an alternator. In a test machine, the alternator was set to extract power at a torque coefficient of 0.008; however, use of a higher torque coefficient up to about 0.011 is feasible as shown in FIG. 5, in which the torque coefficient is plotted against the wind speed ratio $V/\Omega R$, that is, the ratio of wind velocity to blade tip velocity. The blade tip velocity is held substantially constant by furling and unfurling the rotor; for this purpose it is important that friction in the furling hinge bushing 45 be minimized. Because of its efficient design, the slender two-bladed rotor will start at relatively low wind speeds when unloaded; and power can be engaged at approximately 10 to 12 miles per hour, at a minimum furl angle of say 15°, as established by the anti-furling stop 81 and maintained by pre-tension in the spring 75. In a typical design, the machine will reach its design torque coefficient of 0.011 at a wind speed of say 22 miles per hour and at the minimum furling angle. The torque coefficient may then be maintained at increased wind velocity by progressively furling the rotor to about 50°, until the wind speed ratio of approximately 0.185 is reached as shown in FIG. 5, that is, approximately 40 miles per hour. The progressive furling of the rotor from 15° to 50° will have assured operation at the constant torque coefficient selected.

Power cut-off, through a conventional electrical switch (not shown), is necessary when utilizing the alternator to avoid going into the stall region, shown at the upper right of FIG. 5 and indicated at the 50° furl angle in FIG. 2. Even though a damper 80 is employed to avoid oscillations in furling, a time delay switch may be chosen to avoid repeated cutting off and re-engaging the power extraction. Regardless, the utilization of the inclined thrust axis of the present invention, which avoids overspeed on cut-off of the power, permits smooth operation without substantial rotor speed-up; hence cutting off of the power is not accompanied by any danger to the rotor system. With increasing winds, even to gale force, the rotor, furled against the furling stop 82, will idle safely at furling angles about 85°, as shown in FIGS. 2 and 5; this avoids the necessity for blade feathering.

If instead of utilizing a variable speed alternator, a constant speed induction or synchronous generator is chosen, a substantially similar system may be used without need for a power cut-off. The stall region is avoided by any mechanism which progressively lessens the anti-furling moment (and hence increases the furl angle to hold down the rotational speed) commencing at say furl angles of about 40° and reducing the torque coefficient as shown in the dashed line. Mechanical expedients for reduction of the anti-furling moment at increased furling angles will be apparent; they include familiar mechanisms which will lessen the moment arm of an applied force with increased angle and certain manipulations of the degree of cant of the furling hinge axis 26, either in the plane of the drawing FIG. 3 or out of the plane. Also, to some extent the net anti-furling moment will be reduced at high furl angles by the aerodynamic drag on the rotor hub.

Because of the non-linear relation between torque and thrust, use of an induction generator instead of an alternator may not fully achieve the same constancy of thrust and rotational speed, nor the substantially complete elimination of tendency to overspeed on discontinuance of power extraction. With an alternator the angle of tilt of the rotor axis is preferably 7° to 12°, whereas with an induction generator a substantially lower range, namely 4° to 7°, may be required.

If the designer is willing to sacrifice the advantage of canting the furling axis 26 and to rely on a spring 75 or other means to supply the required anti-furling moment, the furling axis 26 may be made to coincide with the yaw axis 22; such change affords the advantage of avoiding dynamic problems of interrelated movements about separate yaw and furling axes. In such modified construction, a fitting at the forward end of the vane boom might mount directly on the yaw post 15, with the fitting for the components support platform above it on the same axis 22.

Machines constructed according to the present invention are capable of unattended operation at advantageous torque coefficients, being able to withstand changes in wind speed by furling motions subject to the restraint of the damper 80; and the passive cyclic pitch rotor permits rapid yawing movements about the yaw post 15 without danger of destruction. Even gale winds, furling to about 85° permits the rotor to rotate harmlessly.

In summary, rotors whose thrust axis are offset from a yaw post have heretofore utilized multi-bladed rotors of small diameter and fixed pitch. The passive cyclic pitch rotor described effects a great improvement in operation in that, due to the cyclic pitch variation, the thrust vector is directed substantially along the shaft axis, making it possible to design with precision the rotor offset arm, the vane and the components which afford the anti-furling moment. While a multi-bladed passive cyclic pitch system could be designed with substantially increased complexity, the two-bladed rotor, with blades at the opposite ends of a cross shaft and having their aerodynamic centers aft of the shaft axis, represents great simplification in structure and mechanism. One reason for the relatively short radius multi-bladed rotors, heretofore used in the offset thrust configuration, was that the sudden rapid movements about the yaw axis, which characterize an offset rotor system, imposed stresses too great for slender rotor blades. However, the passive cyclic pitch rotor is free of these considerations; aerodynamic and gyroscopic hub moments are substantially eliminated as shown in my copending application heretofore referred to. For these reasons the cyclic pitch rotor in the two-bladed configuration shown is especially well suited for use with the downward inclination of the shaft torque axis.

From this disclosure, other variations will occur to those skilled in the art.

I claim:

1. A wind energy conversion machine comprising mast structure including means to provide a yaw axis, and wind-responsive components supported thereon for substantially free yawing including (a) a rotor having a hub mounting a plurality of rotor blades on a shaft, (b) shaft bushing means projecting the rotor to the windward side of the mast structure, the shaft axis:

(1) being at a fixed moment arm from said yaw axis, whereby rotor thrust applies a furling moment about said yaw axis, and (2) having a downward-and-aft inclination which provides a vertical torque component accompanying extraction of power from the rotor, and (3) whose sense of rotation applies such vertical torque component as an anti-furling moment substantially balancing that part of the furling moment of the rotor thrust which accompanies extraction of power, (c) power extraction means having the same inclination, (d) means to couple the rotor to the power extraction means, (e) wind vane means including a boom having forward at its end a furling hinge, whereby to permit furling of the rotor relative to said wind vane means, and (f) yieldable means operating on said wind vane means to apply about said furling hinge an anti-furling moment in an amount which substantially balances the moment of thrust of the rotor when uncoupled from the power extraction means, whereby to substantially overcome the tendency of the rotor to overspeed on discontinuance of coupling of the rotor to the power extraction means.

2. A wind energy conversion machine as defined in claim 1, further including (g) means to damp motion about said furling hinge means.

3. A wind energy conversion machine as defined in claim 1, wherein the generator is of the variable speed alternator type.

4. A wind energy conversion machine as defined in claim 1 wherein said rotor hub includes means to afford to the rotor blades passive cyclic pitch change oscillatory movement, whereby to direct their thrust vector substantially along the rotor axis for more precise balance of such furling and anti-furling moments and to permit rapid angular movements of the rotor about the yaw axis without imposing excessive gyroscopic and aerodynamic forces to the blades.

5. A wind energy conversion machine as defined in claim 1 wherein the said rotor hub includes a cross-shaft mounted with freedom for cyclic pitch oscillatory movement, and the number of said blades is two, and said blades project from the opposite ends of said cross-shaft and have their aero-dynamic centers aft of the axis of said cross-shaft.

6. A wind energy conversion machine as defined in claim 5, wherein such freedom for cyclic pitch oscillatory change is substantially the range of plus or minus 10°–12°.

7. A wind energy conversion machine as defined in claim 5, wherein said fixed moment arm is in the range of 0.020 to 0.030 times the rotor radius, and said rotor axis inclination is in the range of 4°–12°.

8. A wind energy conversion machine as defined in claim 5, wherein said fixed moment arm is in the range of 0.020 to 0.030 times the rotor radius, and the ratio of rotor blade area to disc area is substantially 0.032.

9. A wind energy conversion machine as defined in claim 5, wherein said yieldable means to apply an anti-furling moment about said furling hinge includes means to mount said furling hinge on an axis inclined from vertical, whereby the weight of the vane and boom acts to provide a component of such anti-furling moment.

10. A wind energy conversion machine as defined in claim 5, wherein said yieldable means to apply an anti-furling moment about said furling hinge includes an extensible spring.

11. A wind energy conversion machine comprising mast structure including means to provide a yaw axis, and wind-responsive components supported thereon for substantially free yawing including (a) a two-bladed passive cyclic pitch change rotor comprising (1) a power shaft and a hub having a hub axis perpendicular to the axis of such power shaft and terminating in hub ends in each of which a rotor blade is fixedly mounted along such hub axis, and (2) means, secured between such power shaft and the hub, for permitting the hub to oscillate on a cross axis likewise perpendicular to the power shaft but angularly in advance of the hub axis, (b) shaft bushing means projecting the rotor to the windward side of the mast structure along a rotor axis:

(1) at a fixed moment arm from said yaw axis, whereby rotor thrust applies a furling moment about said yaw axis, and (2) having a downward-and-aft inclination, whereby to provide a vertical torque component accompanying extraction of power from the rotor, and (3) whose sense of rotation applies such vertical torque component as an anti-furling moment, whereby to offset that part of the furling moment of the rotor thrust which accompanies extraction of power, (c) power extraction means having the same inclination, (d) means to couple the rotor to the power extraction means, (e) wind vane means including a boom having forward at its end a furling hinge, whereby to permit furling of the rotor relative to said wind vane means, and (f) yieldable means operating on said wind vane means to apply about said furling hinge an anti-furling moment in an amount which substantially balances the moment of thrust of the rotor when uncoupled from the power extraction means, whereby to substantially overcome the tendency of the rotor to overspeed on discontinuance of coupling of the rotor to the power extraction means.

* * * * *